US012124220B2

(12) United States Patent
Tschumi et al.

(10) Patent No.: US 12,124,220 B2
(45) Date of Patent: Oct. 22, 2024

(54) WATCH CASE COMPRISING A BACK ORIENTED IN A PREDEFINED ANGULAR POSITION, WATCH COMPRISING SAID CASE AND METHOD FOR ASSEMBLING SUCH A CASE

(71) Applicant: The Swatch Group Research and Development Ltd, Marin (CH)

(72) Inventors: Philipp Tschumi, Niederwil (CH); Philippe Scherrer, Delémont (CH)

(73) Assignee: The Swatch Group Research and Development Ltd, Marin (CH)

( * ) Notice: Subject to any disclaimer, the term of this patent is extended or adjusted under 35 U.S.C. 154(b) by 285 days.

(21) Appl. No.: 17/659,362

(22) Filed: Apr. 15, 2022

(65) Prior Publication Data

US 2023/0068766 A1 Mar. 2, 2023

(30) Foreign Application Priority Data

Aug. 25, 2021 (EP) .................................... 21193001

(51) Int. Cl.
*G04B 37/00* (2006.01)
*G04B 37/11* (2006.01)

(52) U.S. Cl.
CPC .......... *G04B 37/0008* (2013.01); *G04B 37/11* (2013.01)

(58) Field of Classification Search
CPC ................ G04B 37/0008; G04B 37/11; G04B 37/0033; G04B 37/113; G04B 19/286; G04B 19/283
See application file for complete search history.

(56) References Cited

U.S. PATENT DOCUMENTS

| | | | | |
|---|---|---|---|---|
| 5,923,622 A * | 7/1999 | Chung | G04B 19/286 | 368/309 |
| 7,324,410 B1 * | 1/2008 | Ziv | G04B 45/0084 | 368/283 |
| 7,976,214 B2 * | 7/2011 | Hiranuma | G04B 37/005 | 368/309 |
| 11,698,607 B2 * | 7/2023 | Haering | G04B 45/0092 | 368/310 |

FOREIGN PATENT DOCUMENTS

| | | |
|---|---|---|
| CH | 699 941 B1 | 12/2013 |
| EP | 2 182 416 A1 | 5/2010 |
| JP | 2010-127683 A | 6/2010 |

OTHER PUBLICATIONS

European Search Report issued Jan. 18, 2022 in European Application 21193001.1, filed on Aug. 25, 2021 (with English Translation of Categories of cited documents) 3 pages.
Japanese Office Action issued on Apr. 11, 2023 in Japanese Patent Application No. 2022-079969 (with English translation), 6 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A watch case includes a middle having a first opening receiving a crystal, opposite a second opening receiving a back. The back is held such that it bears against an annular bearing surface of the middle by a threaded ring cooperating, by screwing, with the middle. The back includes a first indexing element to cooperate with a second indexing element with which the middle is provided so as to immobilise the back in a single angular position such that it cannot rotate relative to the middle.

11 Claims, 3 Drawing Sheets

WATCH CASE COMPRISING A BACK ORIENTED IN A PREDEFINED ANGULAR POSITION, WATCH COMPRISING SAID CASE AND METHOD FOR ASSEMBLING SUCH A CASE

CROSS-REFERENCE TO RELATED APPLICATION

This application claims priority to European Patent Application No. 21193001.1 filed on Aug. 25, 2021, the entire disclosure of which is hereby incorporated herein by reference.

TECHNICAL FIELD OF THE INVENTION

The invention relates to the horological field, and in particular to the components of a watch case.

More particularly, the invention relates to a watch case having a back oriented in a predefined angular position, to a watch comprising said case and to a method for assembling such a case.

TECHNOLOGICAL BACKGROUND

Watch cases have a middle on either side of which a crystal and a back are disposed.

The back is generally attached to the middle by screwing, and for this purpose has an external thread intended to cooperate with an internal thread made in the middle.

This type of attachment does not allow the orientation of the back to be controlled relative to the middle, and in particular relative to a vertical 12 o'clock-6 o'clock axis, when they are attached to one another.

Such a drawback is particularly prejudicial to the aesthetics and perceived quality when the back has decorative elements or inscriptions.

The solutions developed in the prior art are generally complex and expensive to implement.

In particular, the specific machining of an internal thread in the middle and of an external thread on the back is known and carried out such that they are associated with one another so that when said back is fixed to said middle, the angular position thereof is known and always the same. However, in practice, this solution presents difficulties both for the manufacturing process and as regards after-sales services, for example if a lost or damaged back must be replaced.

SUMMARY OF THE INVENTION

The invention overcomes the aforementioned drawbacks by providing a solution that allows a back to be attached to a middle in a single, predefined, relative angular position.

For this purpose, the present invention relates to a watch case comprising a middle having a first opening receiving a crystal, opposite a second opening receiving a back, the back is held such that it bears against an annular bearing surface of the middle by a threaded ring cooperating, by screwing, with said middle, the back comprising a single first indexing element configured to cooperate with a single second indexing element with which the middle is provided so as to immobilise said back such that it cannot rotate relative to the middle in a single, predefined angular position.

Thanks to these features, the angular positioning of the back does not need to be adjusted relative to the middle after it has been attached to the middle insofar as it is rotationally locked in a single predefined position.

The present invention also allows the tightening torque of the back, and in particular of the ring, to be controlled since, when the ring is being screwed onto the middle, the back is oriented in the predefined position.

The orientation of the back is achieved with great precision thanks to the cooperation between the first and second indexing elements, said indexing elements acting as fool-proofing elements insofar as they allow the back to be immobilised in a single angular position relative to the middle. In other words, thanks to the features of the invention, the back can only be positioned in a single angular position relative to the middle.

This specific feature also guarantees simple production and assembly of the watch case, which helps to reduce the manufacturing costs of watches that comprise this case.

It is understood from the features of the present invention that the first and second indexing elements block the rotational mobility of the back and that the ring blocks the translational mobility of the back.

According to specific embodiments, the invention can further include one or more of the following features, which must be considered singly or according to any combinations technically possible.

According to specific embodiments, the first and second indexing elements are formed by a tab/notch pair.

According to specific embodiments, the middle has an internal thread with which an external thread provided on the ring cooperates by screwing.

According to specific embodiments, the back has a peripheral lip extending radially around the periphery of said back, and being arranged to rest against the annular bearing surface of the middle.

According to specific embodiments, the ring has an annular portion comprising the external thread and an end surface via which it bears against the peripheral lip of the back.

According to specific embodiments, the peripheral lip extends from a tubular wall forming an upper end of the back, the tubular wall being engaged in a bore in the middle.

According to specific embodiments, the notch is arranged on the tubular wall and extends axially from a free end of said tubular wall, said notch being configured to cooperate with the tab, said tab being arranged on the bore.

According to specific embodiments, a packing is arranged between the middle and the back, and is sandwiched between a shoulder formed by the junction between the tubular wall and the peripheral lip, and an annular indentation in the middle formed at the junction between the annular bearing surface and the bore.

According to specific embodiments, the ring has a radial portion connected to the annular portion and having a radial inner surface arranged facing an annular bearing surface of the back.

According to specific embodiments, the radial portion of the ring has a lower cylindrical surface facing which is arranged a lower cylindrical surface of the back that is complementary in shape.

According to another object, the present invention relates to a watch comprising a horological movement housed inside an internal volume of a watch case as described hereinabove, said internal volume being defined between the middle, the crystal and the back.

According to yet another object, the present invention relates to a method for assembling a watch case as described hereinabove, wherein the back is engaged in the second opening of the middle such that the first indexing element cooperates with the second indexing element, then the ring is screwed with the middle so as to immobilise said back bearing against said middle.

BRIEF DESCRIPTION OF THE FIGURES

Other features and advantages of the invention will be better understood upon reading the following detailed description, which is given as a rough guide and in no way as a limiting guide, with reference to the accompanying drawings, in which.

DETAILED DESCRIPTION OF THE INVENTION

Figure 1:
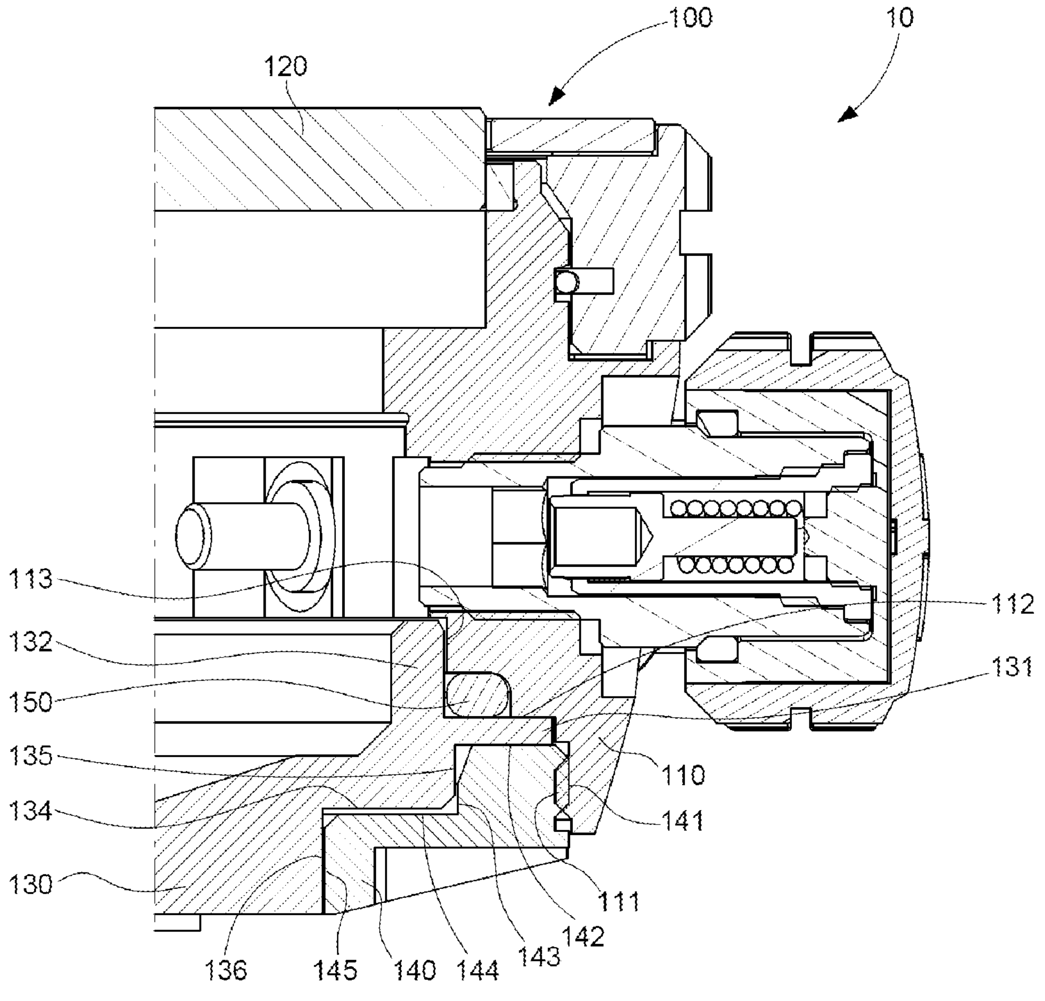
FIG. 1 shows a cross-sectional view of a watch comprising a case according to a preferred example embodiment of the invention.

FIG. 1 shows a cross-sectional view of a watch 10 having a watch case 100 according to the present invention.

The case 100 has a middle 110 having a first opening receiving a crystal 120, opposite a second opening receiving a back 130; the crystal 120, the back 130 and the middle 110 defining a volume inside which a horological movement is arranged in a manner known to a person skilled in the art.

Since the horological movement and the other timepiece components used in a case 100 are known to a person skilled in the art and are not a part of the present invention, they are not described hereinbelow.

The case 100 has a ring 140 adapted to be attached to the middle 110 while holding the back 130 in position against the latter.

Figure 2:
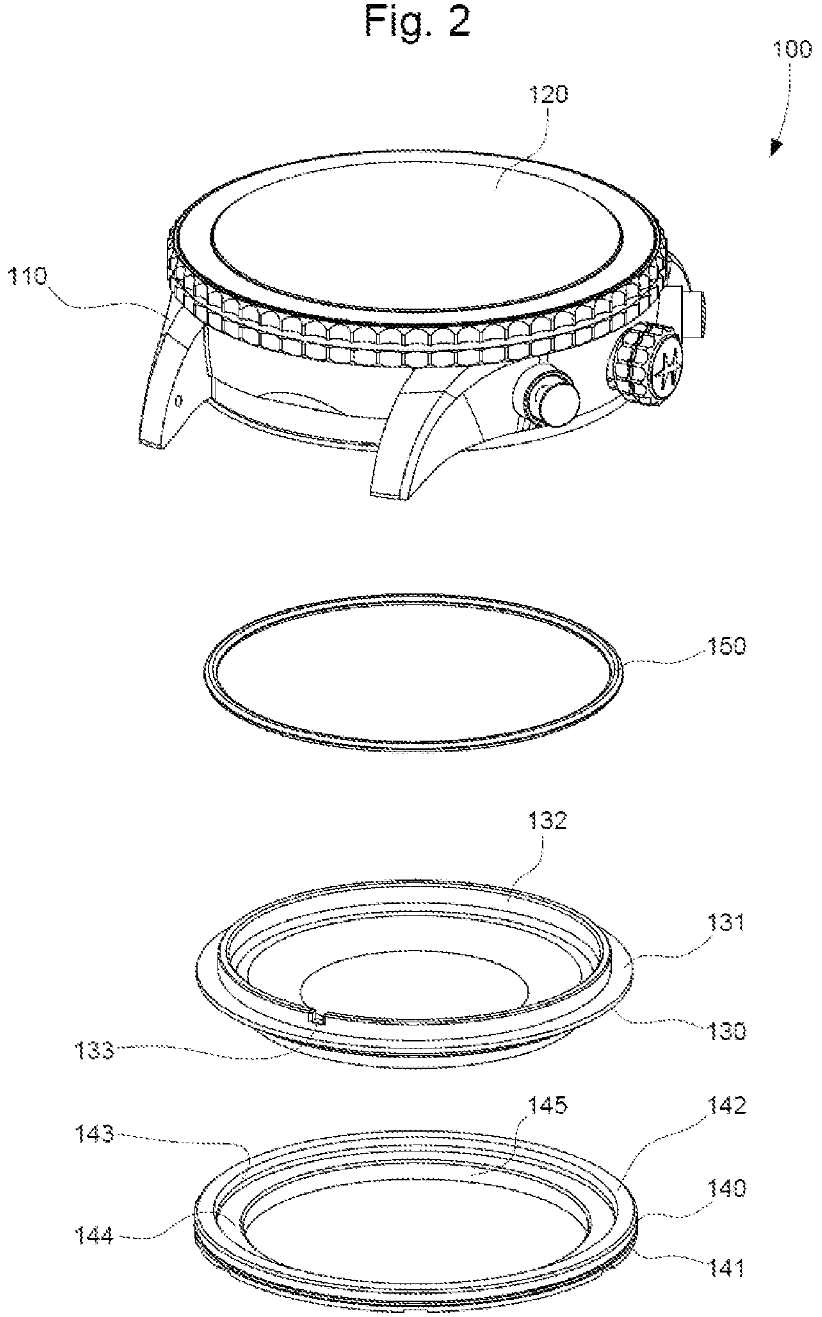
FIG. 2 shows an exploded, high-angle perspective view of the case in FIG. 1, wherein a single first indexing element with which the back is provided is visible.
Figure 3:
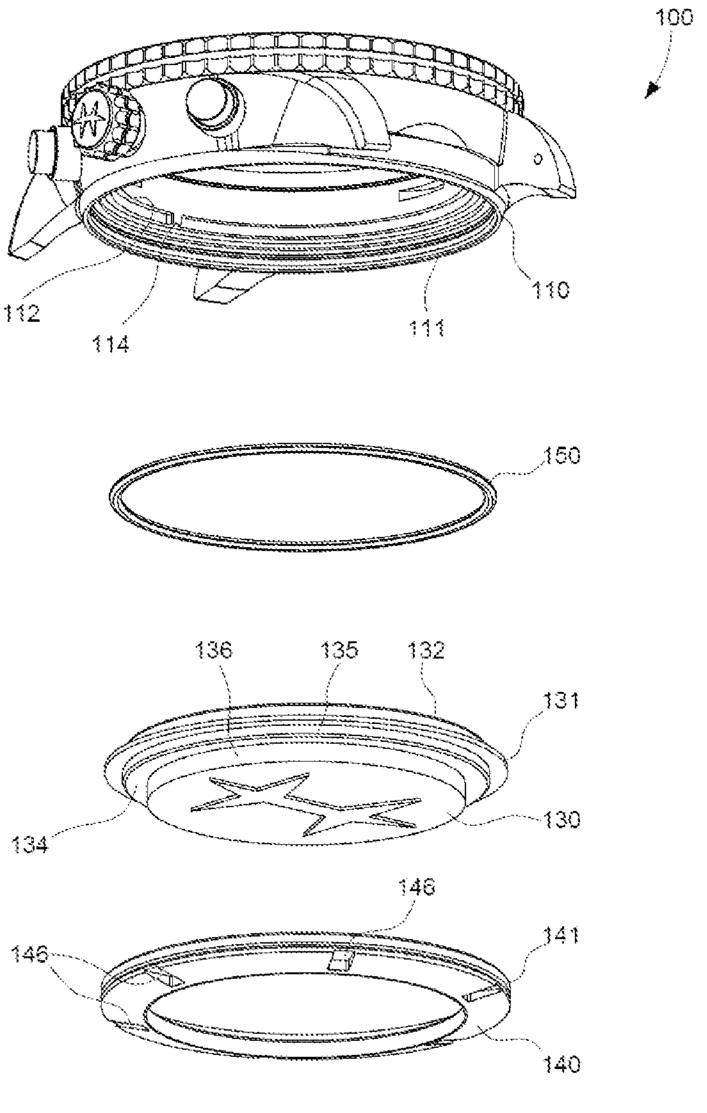
FIG. 3 is an exploded, low-angle perspective view of the case in FIG. 1, wherein a single second indexing element with which the middle is provided is visible.

The ring has a central through-hole through which the back is visible, as shown in FIGS. 1 to 3.

It should be noted that the back 130, the ring 140 and the middle 110 have axisymmetric geometries, the axes of revolution whereof are coaxial, as shown in FIGS. 2 and 3.

The ring 140 has an external thread 141 via which it is intended to cooperate, by screwing, with an internal thread 111 made in the middle 110, at the second opening.

Even more specifically, in the preferred example embodiment of the present invention, the ring 140 has, at one of the ends thereof, referred to as the "upper end", an axial annular portion defined by an end surface 142 connecting an upper cylindrical surface 143 and an outer surface, the external thread 141 being made on the outer surface of the annular portion.

The terms "upper" and "lower" in the present text refer to the orientation in space of a case 100 as shown in FIGS. 1 to 3, with the crystal 120 being arranged above the back 130.

Moreover, the back 130 has a peripheral lip 131 extending radially around the periphery of the back 130, from a tubular wall 132 forming an upper end of said back 130, said peripheral lip 131 being arranged to rest against an annular bearing surface 112 of the middle 110. Furthermore, the tubular wall 132 is engaged in a bore 113 in the middle 110 when the back is attached to said middle 110.

Alternatively, the back 130 can have a plurality of peripheral lips (not shown in the figures), each extending radially around a portion of the periphery of the back 130, in one and the same plane.

As shown in the cross-sectional view in FIG. 1, the ring 140 is configured such that it bears against the peripheral lip 131 of the back 130 via the end surface 142 of the annular portion, when said ring 140 is screwed with the middle 110.

Advantageously, the back 130 comprises a single first indexing element configured to cooperate with a single second indexing element with which the middle 110 is provided, so as to immobilise said back 130 in a single possible angular position relative to the middle 110 when the ring 140 attaches the back 130 to said middle 110.

More particularly, the first and second indexing elements are formed by a tab/notch pair.

In the example embodiment shown in FIGS. 2 and 3, the back 130 is provided with a notch 133 arranged on the tubular wall 132, said notch extending axially from a free end of said tubular wall 132.

The notch 133 is intended to cooperate with a tab 114 extending inside the middle 110. More particularly, the tab 114 is arranged on the bore 113 and has a shape that is complementary to that of the notch 133, within mechanical clearance tolerances, so as to be able to engage inside the notch 133 when the tubular wall 132 of the back 130 is inserted into the bore 113.

It should be noted that in other example embodiments of the invention not shown in the figures, the notch 133 can be arranged in the middle 110 and the tab 114 can be arranged on the back 130, in a similar manner to that of the preferred example embodiment shown in the figures.

The ring 140 has a radial portion having an inner radial surface 144 intended to be arranged facing an annular bearing surface 134 of the back 130, when the ring 140 is screwed with the internal thread 111 of the middle 110. The radial portion is connected to the annular portion, as shown in FIG. 1.

Advantageously, the attachment ring 140 can optionally bear against the peripheral annular bearing surface 134 of the back 130 in addition to bearing against the peripheral lip 131.

This annular bearing surface 134 is connected to the peripheral lip 131 by an upper cylindrical surface 135 intended to be arranged facing the upper cylindrical surface 143 of the annular portion of the ring 140, when the back 130 is attached to the middle 110.

Furthermore, a packing 150 is arranged between the middle 110 and the back 130, and is sandwiched between a shoulder formed by the junction between the tubular wall 132 and the peripheral lip 131, and an annular indentation in the middle 110 formed at the junction between the annular bearing surface 112 and the bore 113. This feature makes it possible, on the one hand, to guarantee the sealing of the case 100 because the packing 150 is subjected to axial and radial compression forces exerted by the back 130 and the middle 110, and on the other hand, to facilitate the arrangement of the packing on the back 130.

The radial portion of the ring 140 has a lower cylindrical surface 145 facing which is arranged a lower cylindrical surface 136 of the back 130 that is complementary in shape.

When the back 130 is attached to the middle 110, the back 130 is firstly engaged in the second opening of the middle 110 such that the tab 114 cooperates with the notch 133, the tubular wall 132 of the back 130 being engaged in the bore 113 of the middle 110 until the peripheral lip 131 is arranged such that it bears against the annular bearing surface 112.

The back 130 and the middle 110 thus form a housing defined between the upper cylindrical surface 135, the peripheral lip 131 and the internal thread 111 of the middle 110, in which the ring 140 is intended to be engaged.

The ring 140 is thus brought to cooperate with the internal thread 111 of the middle 110, until the peripheral lip 131 is clamped against the annular bearing surface 112 and a predetermined tightening torque is reached that is sufficient to rigidly attach, i.e. according to a mechanical connection of the embedding type, the back 130, the ring 140 and the middle 110 together.

Advantageously, the ring 140 can have a neck-moulding or a chamfer at the junction between the upper cylindrical surface 143 of the annular portion and the end surface 142, and the back 130 can also have a neck-moulding or a chamfer at the junction between the annular bearing surface 134 and the upper cylindrical surface 135, so as to facilitate the insertion of the ring 140 into the housing formed between the back 130 and the middle 110.

Moreover, a chamfer or a neck-moulding can be provided at the junction between the cylindrical surface of the radial portion of the ring 140 and the inner radial surface 144 of said radial portion.

Preferably, the ring 140 has, on an outer face opposite the internal volume of the watch case 100, radial notches 146 intended to cooperate with a tool handled by a user. Thanks to the radial notches 146, the ring 140 can be screwed or unscrewed by handling the tool, so as to attach the ring 140 and the back 130 to the middle 110, or conversely, so as to detach them from said middle 110.

The invention claimed is:

1. A watch case comprising:

a middle having a first opening receiving a crystal, opposite a second opening receiving a back, wherein the back is held such that it bears against an annular bearing surface of the middle by a threaded ring cooperating, by screwing, with said middle, the back comprising a single first indexing element configured to cooperate with a single second indexing element with which the middle is provided so as to immobilize said back such that it cannot rotate relative to said middle in a single, predefined angular position, wherein the back has a peripheral lip extending radially around the periphery of said back, an upper surface of the lip is configured to rest against a lower annular bearing surface of the middle, a lower surface of the lip is configured to rest against a first upper surface of the ring, and wherein the ring has an upper radial inner surface different from the first upper surface of the ring, arranged facing an annular bearing surface of the back different from the lower surface of the lip.

2. The watch case according to claim 1, wherein the first and second indexing elements are formed by a tab/notch pair.

3. The watch case according to claim 1, wherein the middle has an internal thread with which an external thread provided on the ring cooperates by screwing.

4. The watch case according to claim 1, wherein the ring has an annular portion comprising the external thread.

5. The watch case according to claim 1, wherein the peripheral lip extends from a tubular wall forming an upper end of the back, the tubular wall being engaged in a bore in the middle.

6. The watch case according to claim 5, wherein the notch is arranged on the tubular wall and extends axially from a free end of said tubular wall, said notch being configured to cooperate with the tab, said tab being arranged on the bore.

7. The watch case according to claim 5, wherein a packing is arranged between the middle and the back, and is sandwiched between a shoulder formed by the junction between the tubular wall and the peripheral lip, and an annular indentation in the middle formed at the junction between the annular bearing surface and the bore.

8. The watch case according to claim 4, wherein the ring has a radial portion connected to the annular portion.

9. The watch case according to claim 8, wherein the radial portion of the ring has a lower cylindrical surface facing which is arranged a lower cylindrical surface of the back that is complementary in shape.

10. A watch comprising:

a horological movement housed inside an internal volume of the watch case according to claim 1, said internal volume being defined between the middle, the crystal and the back.

11. A method for assembling the watch case according to claim 1, comprising:

engaging the back in the second opening of the middle such that the first indexing element cooperates with the second indexing element, then screwing the ring with the middle so as to immobilize said back bearing against said middle.

* * * * *